(12) United States Patent
Qiu et al.

(10) Patent No.: US 9,994,740 B2
(45) Date of Patent: Jun. 12, 2018

(54) FLUOROALKYL SILICONES

(71) Applicant: 3M INNOVATIVE PROPERTIES COMPANY, St. Paul, MN (US)

(72) Inventors: Zai-Ming Qiu, Woodbury, MN (US); Jitendra S. Rathore, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 435 days.

(21) Appl. No.: 14/785,355

(22) PCT Filed: May 15, 2014

(86) PCT No.: PCT/US2014/038026
§ 371 (c)(1),
(2) Date: Oct. 19, 2015

(87) PCT Pub. No.: WO2014/193654
PCT Pub. Date: Dec. 4, 2014

(65) Prior Publication Data
US 2016/0122594 A1    May 5, 2016

Related U.S. Application Data

(60) Provisional application No. 61/829,577, filed on May 31, 2013.

(51) Int. Cl.
| C09D 183/08 | (2006.01) |
| C09J 7/02 | (2006.01) |
| C08G 77/385 | (2006.01) |
| C08G 77/24 | (2006.01) |

(52) U.S. Cl.
CPC .............. *C09J 7/201* (2018.01); *C08G 77/24* (2013.01); *C08G 77/385* (2013.01); *C09D 183/08* (2013.01); *C09J 7/401* (2018.01); *C09J 2427/00* (2013.01); *C09J 2483/00* (2013.01); *C09J 2483/005* (2013.01); *Y10T 428/14* (2015.01)

(58) Field of Classification Search
None
See application file for complete search history.

(56) References Cited

U.S. PATENT DOCUMENTS

| 2,519,983 A | 8/1950 | Simons |
| 3,159,662 A | 12/1964 | Ashby |
| 3,178,464 A | 4/1965 | Pierpoint |
| 3,220,972 A | 11/1965 | Lamoreaux |
| 3,313,773 A | 4/1967 | Lamoreaux |
| 3,410,886 A | 11/1968 | Joy |
| 3,470,225 A | 9/1969 | Knorre |
| 3,567,755 A | 3/1971 | Seyfried |
| 3,715,334 A | 2/1973 | Karsted |
| 3,775,452 A | 11/1973 | Karstedt |
| 3,814,730 A | 6/1974 | Karstedt |
| 3,814,731 A | 6/1974 | Nitzsche |
| 4,276,252 A | 6/1981 | Kreis |
| 4,288,345 A | 9/1981 | Ashby |
| 4,489,201 A * | 12/1984 | von Au ................. C08G 77/24 528/21 |
| 4,510,094 A | 4/1985 | Drahnak |
| 4,530,879 A | 7/1985 | Drahnak |
| 4,603,215 A | 7/1986 | Chandra |
| 4,640,939 A | 2/1987 | Cavezzan |
| 4,670,531 A | 6/1987 | Eckberg |
| 4,699,813 A | 10/1987 | Cavezzan |
| 4,705,765 A | 11/1987 | Lewis |
| 4,712,092 A | 12/1987 | Boldridge, Jr. |
| 4,916,169 A | 4/1990 | Boardman |
| 5,082,706 A | 1/1992 | Tangney |
| 5,286,815 A | 2/1994 | Leir |
| 5,317,073 A | 5/1994 | Evans |
| 5,466,877 A | 11/1995 | Moore |
| 5,578,381 A | 11/1996 | Hamada |
| 5,639,845 A | 6/1997 | Inomata |
| 5,750,797 A | 5/1998 | Vitcak |
| 5,869,728 A | 2/1999 | Jenker |
| 6,129,980 A | 10/2000 | Tsukada |
| 6,204,350 B1 | 3/2001 | Liu |
| 6,376,569 B1 | 4/2002 | Oxman |
| 6,479,610 B1 | 11/2002 | Singh |
| 7,199,197 B2 | 4/2007 | Caldwell |
| 7,279,210 B2 | 10/2007 | Hulteen |

(Continued)

FOREIGN PATENT DOCUMENTS

| EP | 0238033 | 9/1987 |
| EP | 0640644 | 1/1995 |

(Continued)

OTHER PUBLICATIONS

Machine translation of JP 2014-088335 (no date).*
Written translation of JP 2002-029921 (no date).*
Ameduri, "Synthesis and properties of fluorosilicon-containing polybutadienes by hydrosilylation of fluorinated hydrogenosilanes", Journal of Fluorine Chemistry, 1995, vol. 74, pp. 191-197.
Anrong, "Cyclizations of 5-Hexenyl, 6-Heptenyl, 7-0ctenyl, and 8-Nonenyl Radicals. The Kinetic and Regiochemical Impact of Fluorine and Oxygen Substituents11," The Journal of Organic Chemistry, Aug. 6, 1999, vol. 64, No. 16, pp. 5993-5999.
Childs, "Anodic Fluorination," Organic Electrochemistry, 1991, pp. 1103-1127.

(Continued)

*Primary Examiner* — Marc S Zimmer
(74) *Attorney, Agent, or Firm* — Kent S. Kokko

(57) ABSTRACT

Novel fluoroalkyl silicones, and use thereof in release coatings, are described. The fluoroalkyl silicones are of the general formula: (I).

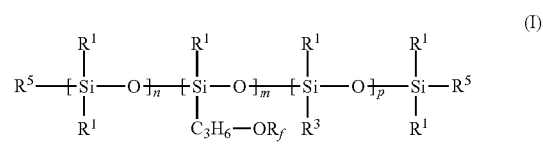

23 Claims, No Drawings

(56) References Cited

U.S. PATENT DOCUMENTS

| | | |
|---|---|---|
| 7,297,210 B2 | 11/2007 | Hongo |
| 7,763,678 B2 | 7/2010 | Yamaya |
| 2011/0244226 A1 | 10/2011 | Seth |
| 2012/0052685 A1 | 3/2012 | Ogihara |
| 2012/0157702 A1* | 6/2012 | Marciniec ............ C08G 77/045 556/446 |
| 2012/0157703 A1 | 6/2012 | Marciniec |
| 2012/0219794 A1 | 8/2012 | Seth |

FOREIGN PATENT DOCUMENTS

| | | |
|---|---|---|
| GB | 2443626 | 5/2008 |
| JP | 6184312 | 7/1994 |
| JP | 10-338749 | 12/1998 |
| JP | 2002029921 | 1/2002 |
| JP | 2014-088335 A * | 5/2014 |
| SU | 507406 A * | 6/1984 |
| WO | WO 1998-40439 | 9/1998 |
| WO | WO 2011-059462 | 5/2011 |
| WO | WO 2014-099497 | 6/2014 |

OTHER PUBLICATIONS

Database WPI Week 200259, Thomson Scientific, London, GB; AN 2002-551302, 3 pages, XP002727274O6.

Furukawa, "Reactivity of Cyclosiloxane with 3,3,4,4,5,5,6,6,6-Nonafluorohexyl Group and its Application to Fluorosilicone Synthesis," Journal of Applied polymer Science, 2001, vol. 82, pp. 3333-3340.

Furukawa, "Synthesis and Properties of Fluorosilicone with Perfluorooctylundecyl Side Chains," Journal of Polymer Science, Part A: Polymer Chemistry, 2003, vol. 41, 2003, pp. 2704-2714.

Kobayashi, "Surface Tension of Poly [(3,3,4,4,5,5,6,6,6-nonafluorohexyl)-methylsiloxane]," Macromolecules, 1990, vol. 23, pp. 4929-4933.

Kobler, "A Simple Synthesis of Tetraalkylammonium Salts with Functional Anions," Justus Liebigs Annalen der Chemie, 1978, pp. 1937-1945.

Sneed, "The Alkali Metals," Comprehensive Inorganic Chemistry, 1957, pp. 61-64.

Nagase, "Electrochemical Fluorination," Fluroine Chemistry Reviews, 1967, vol. 1, No. 1, pp. 77-106.

International Search Report for PCT International Application No. PCT/US2014/038026 dated Jul. 29, 2014, 3 pages.

* cited by examiner

FLUOROALKYL SILICONES

CROSS REFERENCE TO RELATED APPLICATIONS

This application is a national stage filing under 35 U.S.C. 371 of PCT/US2014/038026, filed May 15, 2014, which claims priority to U.S. Application No. 61/829577, filed May 31, 2013, the disclosure of which is incorporated by reference in its/their entirety herein.

BACKGROUND

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available. PSAs, particularly silicone PSAs offer one or more of the following useful characteristics: adhesion to low surface energy (LSE) surfaces, quick adhesion with short dwell times, wide use temperature (i.e., performance at high and low temperature extremes), moisture resistance, weathering resistance (including resistance to ultraviolet (UV) radiation, oxidation, and humidity), reduced sensitivity to stress variations (e.g., mode, frequency and angle of applied stresses), and resistance to chemicals (e.g., solvents and plasticizers) and biological substances (e.g., mold and fungi).

Fluorinated release coatings are often used with PSAs, particularly silicone PSAs, to provide desired release properties. In some embodiments, the desired release force is no greater than 50 g/25 mm, e.g., no greater than 30 g/25 mm at 180 degrees peel angle and 230 cm/min (90 inches/min). However, the selection of fluorinated release coatings available to achieve the desired release performance is limited, particularly for wet-cast (e.g., solvent-based, water-based, and hot melt coated) PSAs. For example, few release materials provide stable, consistent, smooth release of an adhesive.

The most common fluorinated release coatings are fluorosilicone materials with pendent $R_fCH_2CH_2$— group made from $R_f$—CH=$CH_2$, wherein $R_f$ is typically a $CF_3$— or a $CF_3CF_2CF_2CF_2$— group. However, commercially available fluorosilicone release coatings are typically more expensive. The reasons for high cost of commonly used fluorosilicone release materials are believed to related a) the lower reactivity of $R_fCH$=$CH_2$ to low yield hydrosilylation reactions, and b) the preparation from expensive $R_f$—I with two steps, i) addition to ethylene to form $R_f$—$CH_2CH_2$—I and ii) elimination of HI.

The present disclosure further provides novel fluoroalkyl silicones that can be used as release materials or can also be blended with one or more additional low surface energy materials (e.g., fluoropolymers, polyactylates with pendent $R_f$ group, lower cost fluoroalkyl silicones and non-fluorinated silicones) while maintaining the desired low release characteristics of the instant fluorosilicone material. In addition, in some embodiments, high blend ratios of low surface energy materials may be used without detrimentally affecting the readhesion force of the adhesive after removal of the blended release materials comprising the present fluorosilicones.

Applicants have identified high reactive fluorinated alkenes for high yield of hydrosilylation products (from hydrosilicones) and subsequently providing novel fluoroalkyl silicones having similar or better performance to current products at reduced cost.

SUMMARY

The present disclosure relates to novel fluoroalkyl silicones and use thereof as release materials. In another aspect, the present disclosure provides release liners comprising a substrate and the release material according to the present disclosure bonded to a major surface of the substrate. In another aspect, the present disclosure providers a crosslinked or uncrosslinked coating comprising a fluoroalkyl silicone release material.

In yet another aspect, the present disclosure provides adhesive articles comprising an adhesive having a first major surface and a second major surface, wherein the first major surface of the adhesive is in contact with a release material according to the present disclosure. In some embodiments, the adhesive articles further comprise a first substrate (or backing) having a first major surface and a second major surface, wherein the release material is bonded to the first major surface of the first substrate. In some embodiments, the second major surface of the adhesive is in contact with the second major surface of the first substrate. In some embodiments, the second major surface of the adhesive is in contact with a second, independently selected release material bonded to the second major surface of the first substrate. In some embodiments, the adhesive articles further comprise a second substrate, wherein the second major surface of the adhesive is in contact with a major surface of the second substrate.

In some embodiments, the adhesive comprises a silicone adhesive. In some embodiments, the silicone adhesive comprises a poly(diorganosiloxane). In some embodiments, the silicone adhesive comprises a polydiorganosiloxane-polyurea block copolymer. In some embodiments, the silicone adhesive comprises a polydiorganosiloxane-polyoxamide copolymer. In some embodiments, the silicone adhesive further comprises a tackifier. In other embodiments, the adhesive comprises an acrylate adhesive.

In another aspect the present disclosure provides a method of making the fluoroalkyl silicones by the hydrosilylation reaction between a perfluoroalkyl vinyl ether and a hydrosilicone.

DETAILED DESCRIPTION

The present disclosure provides novel fluoroalkyl silicones of the formula:

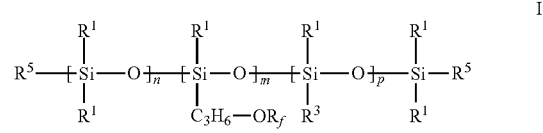

wherein
each $R^1$ is independently an alkyl or aryl;
$R_f$ is perfluoroalkyl of the formula:

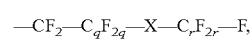

where q and r are independently 0 to 4;
X is a covalent bond, —O—, or —$NR_f^1$ where $R_f^1$ is $C_1$-$C_3$ perfluoroalkyl;

$R^3$ is —H, —$OR^4$ or —$(C_3H_6)_3$—$R^4$, where $R^4$ is $C_1$-$C_{50}$ alkyl;

n is 0 to 2000, preferably at least 10;

m may be zero;

p may be 0 to 2000, and n+p is at least one;

$R^5$ is H, alkyl, aryl —$(C_3H_6)$—O—$R_f$ or $R^3$;

wherein the fluoroalkyl silicone has at least one $R_f$ group, preferably at least two $R_f$ groups, either as $R^5$ and/or in the siloxane unit with the subscript m. In some embodiments p is at least one, preferably at least 2. $R_f$ may contain 1 to 8, preferably 2 to 6, perfluorinated carbon atoms.

In some embodiments the ratio of m:p is from 100:0 to 10:90.

The disclosed fluoroalkyl silicones contain pendent or terminal —$(C_3H_6)$—$OR_f$ group, which may further contain reactive hydrosilane groups (H—Si), alkoxysilane groups (RO—Si), alkyl silane groups (Si—R), either as $R^5$ and/or in the siloxane unit with the subscript p. In some embodiments the alkyl and alkoxy groups of the silicone can be long chains ($C_{16}$-$C_{50}$), either as $R^5$ and/or in the siloxane unit with the subscript p.

The novel fluoroalkyl silicone of Formula I may be prepared by hydrosilylation in the presence of a hydrosilylation catalyst, of a perfluoroalkyl allyl ether of the formula:

$$R_f\text{—OCH}_2\text{CH}=\text{CH}_2, \quad \text{II}$$

with a hydrosilicone of the formula:

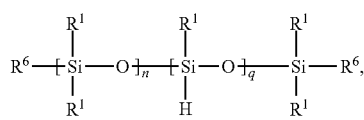

where each $R^1$ is independently an alkyl or aryl;

n is 0 to 2000; preferably at least 10;

q may be zero;

$R^6$ is H, alkyl or aryl;

with the proviso that the hydrosilicone contains at least one Si—H group, preferably at least two Si—H groups. Thus the silicone unit with the subscript q of Formula III may be at least one, preferably at least 2, and or $R^6$ can be H.

All or a portion of the Si—H groups of the hydrosilicone may be reacted with the allyl ether of Formula III. In some embodiments, unreacted hydrosilyl (Si—H) groups may be converted to other useful functional groups, as described herein.

The fluoroalkyl silicone of Formula I have a $M_w$ of at least 200, preferably at least 1000. In some embodiments, the $M_w$ may be 2000 or greater. In some embodiments, the $M_w$ may be limited to 1,000,000 or less; preferably limited to 500,000 or less. In some embodiments n, m and p are each greater than one and where the ratio of n to m is greater than one, preferably the ratio of n to m is greater than 10. In some embodiments, $R^3$ is H, and the ratio of m to p is 10:90 to 100:0, preferably, 20:80 to 80:20. In some embodiments, $R^3$ is $OR^4$ (prepared as described herein).

The fluoroalkyl silicone of Formula I is prepared, in part, with at least one hydrosilicone having a plurality of Si—H groups as represented by Formula III. Examples of useful Si—H group containing silicones include hydride terminated polydimethylsiloxanes having the formula $HMe_2SiO(SiMe_2O)_n SiMe_2H$ (CAS 70900-21-9); hydride terminated methylhydrosiloxane-dimethylsiloxane copolymers having the formula $HMe_2SiO(SiMe_2O)_n(SiMeHO)_q SiMe_2H$ (CAS 69013-23-6); trimethylsiloxane terminated polyethylhydrosiloxanes having the formula $Me_3SiO(SiMeHO)_q SiMe_3$ (CAS 63148-57-2); trimethylsiloxane terminated methylhydrosiloxane-dimethylsiloxane copolymers having the formula $Me_3SiO(SiMe_2O)_n(SiMeHO)_q SiMe_3$ (CAS 68037-59-2); triethylsiloxane terminated polyethylhydrosiloxanes having the formula $Et_3SiO(SiEtHO)_q SiEt_3$ (CAS 24979-95-1); hydride terminated poly(phenyl-dimethylhydrosiloxysiloxanes) having the formula $HSiMe_2O(SiPh(OSiMe_2H)O)_q SiMe_2H$; all commercially available from vendors such as, for example, Gelest, Inc. or Dow Corning Corp.

The fluoroalkyl silicone is the hydrosilylation reaction product of a of hydrosilicone and a perfluoroalkyl allyl ether of the formula:

$$R_f\text{—OCH}_2\text{CH}=\text{CH}_2, \quad \text{II}$$

where $R_f$ is perfluoroalkyl of the formula

—$CF_2$—$C_qF_{2q}$—X—$C_rF_{2r}$—F, where q and r are independently 0 to 4, and X is a covalent bond, —O—, or —$NR_f^1$ where $R_f^1$ is $C_1$-$C_3$ perfluoroalkyl. Preferably q+r is at least 1, more preferably at least two.

It will be appreciated that the $R_f$ group may be linear or branched or a combination thereof, and has a —$CF_2$— group adjacent the ether oxygen. The number of perfluorinated carbon atoms in the group —$CF_2$—$C_qF_{2q}$—X—$C_rF_{2r}$—F is 1 to 8, preferably 3 to 6. Preferred —$R_f$ groups include —$CF_3$, —$CF_2CF_3$, —$CF_2C_2F_5$, —$CF_2C_3F_7$, —$CF_2C_4F_9$, —$CF_2C_5F_{11}$, $CF_3O(CF_2)_2CF_2$—, $(CF_3)_2N(CF_2)_2CF_2$— and $C_3F_7OCF(CF_3)CF_2$—, or —$CF_2CF(CF_3)_2$. The perfluoroalkyl allyl ethers of Formula II may be prepared by the allylation of a perfluorinated acid fluoride, in the presence of fluoride ion, with an allyl compound of the formula:

$$CH_2=CH\text{—}CH_2\text{—}X$$

where "X" is a leaving groups, such as a tosylate, halide, acetoxy or mesylate. As result of the reaction, the fluoroalkyl allyl ethers have a —$CF_2$— group and a —$CH_2$— group adjacent the ether oxygen. Useful allyl compounds include $CH_2=CHCH_2Cl$, $CH_2=CHCH_2Br$, $CH_2=CHCH_2I$, $CH_2=CHCH_2OC(O)R^{10}$, and $CH_2=CHCH_2OSO_3R^{10}$, where $R^{10}$ is alkyl or aryl.

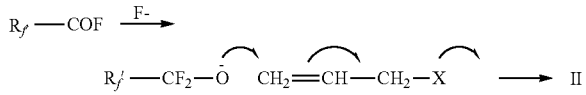

The perfluorinated acyl fluorides can be prepared, for example, by electrochemical fluorination (ECF) of a corresponding hydrocarbon carboxylic acid, or derivative thereof such as a carboxylic acid halide, anhydride or ester, using either anhydrous hydrogen fluoride ("Simons" ECF) or KF.2BF ("Phillips" ECF) as an electrolyte. Details of the "Simons" ECF process may be found in U.S. Pat. No. 2,519,983 (Simons) and by S. Nagase in I FLUORINE Chem. Rev. 77, 77-106 (1967), and W. V. Childs et al, Anodic Fluorination, in ORGANIC FLUOROCHEMISTRY 1103-04, 1113-17 (Benning Lund & Manuel M. Baizer eds., 1991) provide a description of the "Phillips" ECF process. It will be appreciated that acid fluoride group, —COF, will be converted to a $CF_2$ groups: $R_f'$—COF→$R_f$.

Perfluorinated acyl fluorides can also be prepared by dissociation of perfluorinated carboxylic acid esters (which can be prepared from the corresponding hydrocarbon or partially-fluorinated carboxylic acid esters by direct fluorination with fluorine gas). Dissociation can be achieved by contacting the perfluorinated ester with a source of fluoride ion under reacting conditions (see the method described in U.S. Pat. No. 5,466,877 (Moore), whose description is incorporated herein by reference) or by combining the ester with at least one initiating reagent selected from the group consisting of gaseous, non-hydroxylic nucleophiles; liquid, non-hydroxylic nucleophiles; and mixtures of at least one non-hydroxylic nucleophile (gaseous, liquid, or solid) and at least one solvent that is inert to acylating agents.

Initiating reagents that can be employed in this dissociation reaction are those gaseous or liquid, non-hydroxylic nucleophiles and mixtures of gaseous, liquid, or solid, non-hydroxylic nucleophile(s) and solvent (hereinafter termed "solvent mixtures") that are capable of nucleophilic reaction with perfluorinated esters. The presence of small amounts of hydroxylic nucleophiles can be tolerated.

Suitable gaseous or liquid, non-hydroxylic nucleophiles include dialkylamines, trialkylamines, carboxamides, alkyl sulfoxides, oxazolidones, pyridines, and the like, and mixtures thereof. Suitable non-hydroxylic nucleophiles for use in solvent mixtures include such gaseous or liquid, non-hydroxylic nucleophiles, as well as solid, non-hydroxylic nucleophiles, e.g., fluoride, cyanide, cyanate, iodide, chloride, bromide, acetate, mercaptide, alkoxide, thiocyanate, azide, trimethylsilyl difluoride, bisulfite, and bifluoride anions, which can be utilized in the form of alkali metal, ammonium, alkyl-substituted ammonium (mono-, di, tri-, or tetra-substituted), or quaternary phosphonium salts, as well as mixtures thereof. Such salts are in general commercially available but, if desired, can be prepared by known methods, e.g., those described by M. C. Sneed & R. C. Brasted, ne Alkali Metals, in 6 COMPREHENSIVE INORGANIC CHEMISTRY 61-64 (1957) and by H. Kobler et al. in ANN. CHEM. 1937 (Justus Liebigs ed., 1978) whose descriptions are also incorporated herein by reference.

Useful anhydrous fluorine-containing compounds "M$^+$F$^-$" are those that will dissociate to form an anhydrous source of fluoride ion. Such compounds include metal fluorides (e.g., potassium, fluoride, rubidium fluoride, and cesium fluoride), metal bifluorides, and quaternary ammonium and phosphonium fluorides. To ensure an adequate yield of desired product, the anhydrous fluorine-containing compound must be reacted with the fluorinated carbonyl-containing compound at least stoichiometrically, i.e., in a 1:1 molar ratio, relative to the carbonyl groups. Preferably, however, to favor maximum yield, the anhydrous fluorine-containing compound is reacted in a slight molar excess, up to about a ratio of 1.1:1 or 1.5:1 to R$_f'$COF. Fluoride catalyzed reactions of perfluorinated acid fluorides are described in U.S. Pat. No. 5,750,797 (Flynn et al.), incorporated herein by reference.

Preferably, R$_f'$COF is prepared by electrochemical fluoridation from hydrocarbon precursors, such as R'C(O)F, [R'C(O)]$_2$O, CH$_2$=CHC(O)OC$_3$H$_7$ and CH=CMeCO$_2$H$_9$, where R' is C$_1$-C$_8$ alkyl, optional containing a catenary (in-chain) oxygen or nitrogen.

In the presence of the hydrosilylation catalyst, the compounds of perfluoroalkyl allyl ethers of Formula II are hydrosilated by the hydrosilicone of Formula III to produce the fluoroalkyl silicones of Formula I. All or a portion of the Si—H groups may undergo the hydrosilylation with the compound of Formula II. In the following Scheme I, subscription "q" represent the number of original in-chain hydrosilane units, m the number of those in-chain units substituted by hydrosilylation, and subscript s is the number of in-chain Si—H groups remaining. In addition, where R$^6$ is H, all or a portion of those terminal Si—H groups may undergo hydrosilylation to provide terminal R$_f$ groups in the R$^7$. In some embodiments, all of the Si—H groups, whether terminal or in-chain, will be converted to or —(C$_3$H$_6$)—OR$_f$ groups. It will further be understood that hydrosilylation of the fluoroalkyl ether of Formula II can yield two propyl isomers: propylene (Si—(CH$_2$)$_3$—) and isopropylene (Si—CH(CH$_3$)CH$_2$—). These two isomers are illustrated genetically as —C$_3$H$_6$—

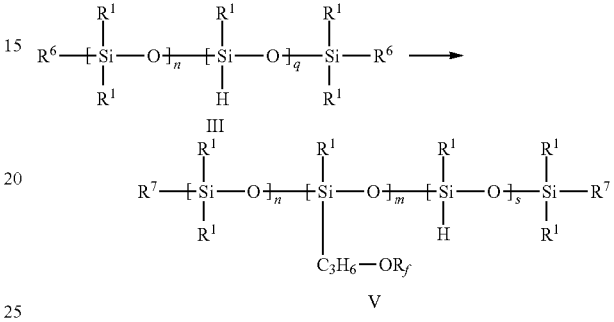

Scheme I where
each R$^1$ is independently an alkyl or aryl;
n is 0 to 2000;
m may be zero, preferably at least 1;
q may be zero;
s may be zero;
R$^6$ is H, alkyl or aryl;
R$^7$ is H, alkyl, aryl or —(C$_3$H$_6$)—OR$_f$;
with the proviso that the starting material of Formula III contain at least one, preferably at least two Si—H groups, and with the proviso that the product of Formula V contains at least one, preferably at least two —(C$_3$H$_6$)—OR$_f$ groups, whether in-chain represented by the units with subscript m, and/or one or both of the R$^7$ groups may be —(C$_3$H$_6$)—OR$_f$ groups. Additionally, where there is partial hydrosilylation of the compounds of Formula II, the product of Scheme 1 will further contain in-chain Si—H groups, represented by the units with subscript s, and/or one or both of the R$^7$ groups may be H.

Regarding the hydrosilylation reaction, numerous patents teach the use of various complexes of cobalt, rhodium, nickel, palladium, or platinum as catalysts for hydrosilylation reactions. For example, U.S. Pat. No. 4,288,345 (Ashby et al) discloses as a catalyst for hydrosilylation reactions a platinum-siloxane complex. Additional platinum-siloxane complexes are disclosed as catalysts for hydrosilylation reactions in U.S. Pat. Nos. 3,715,334, 3,775, 452, and 3,814,730 (Karstedt et al). U.S. Pat. No. 3,470,225 (Knorre et al) discloses production of organic silicon compounds by addition of a compound containing silicon-bonded hydrogen to organic compounds containing at least one non-aromatic double or triple carbon-to-carbon bond using a platinum compound of the empirical formula PtX$_2$(RCOCR'COR")$_2$ wherein X is halogen, R is alkyl, R' is hydrogen or alkyl, and R" is alkyl or alkoxy.

The catalysts disclosed in the foregoing patents are characterized by their high catalytic activity. Other platinum complexes for accelerating the aforementioned thermally-activated addition reaction include: a platinacyclobutane complex having the formula (PtCl$_2$C$_3$H$_6$)$_2$(U.S. Pat. No. 3,159,662, Ashby); a complex of a platinous salt and an olefin (U.S. Pat. No. 3,178,464; Pierpoint); a platinum-containing complex prepared by reacting chloroplatinic acid with an alcohol, ether, aldehyde, or mixtures thereof (U.S. Pat. No. 3,220,972, Lamoreaux); a platinum compound selected from trimethylplatinum iodide and hexamethyldiplatinum (U.S. Pat. No. 3,313,773, Lamoreaux); a hydrocarbyl or halohydrocarbyl nitrite-platinum (II) halide complex (U.S. Pat. No. 3,410,886, Joy); a hexamethyl-dipyridine-diplatinum iodide (U.S. Pat. No. 3,567,755, Seyfried et al); a platinum curing catalyst obtained from the reaction of chloroplatinic acid and a ketone having up to 15 carbon atoms (U.S. Pat. No. 3,814,731, Nitzsche et al); a platinum compound having the general formula (R')PtX$_2$ where R' is a cyclic hydrocarbon radical or substituted cyclic hydrocarbon radical having two aliphatic carbon-carbon double bonds, and X is a halogen or alkyl radical (U.S. Pat. No. 4,276,252, Kreis et al); platinum alkyne complexes (U.S. Pat. No. 4,603,215, Chandra et al.); platinum alkenyl-cyclohexene complexes (U.S. Pat. No. 4.699,813, Cavezzan); and a colloidal hydrosilylation catalyst provided by the reaction between a silicon hydride or a siloxane hydride and a platinum (0) or platinum (II) complex (U.S. Pat. No. 4,705,765, Lewis).

Although these platinum complexes and many others are useful, as catalysts in processes for accelerating the hydrosilylation, processes for promoting the ultraviolet or visible radiation-activated addition reaction between these compounds may be preferable in some instances. Platinum complexes that can be used to initiate ultraviolet radiation-activated hydrosilylation reactions have been disclosed, e.g., platinum azo complexes (U.S. Pat No. 4,670,531, Eckberg); ($\eta^4$-cyclooctadiene)diarylplatinuum complexes (U.S. Pat. No. 4,530,879, Drahnak); and ($\eta^5$-cyclopentadienyl)trialkylplatinum complexes (U.S. Pat. No. 4,510,094, Drahnak). Other compositions that are curable by ultraviolet radiation include those described In U.S. Pat. Nos. 4,640,939 and 4,712,092 and in European Patent Application No. 0238033. U.S. Pat. No. 4,916,169 (Boardman et al) describes hydrosilylation reactions activated by visible radiation. U.S. Pat. No. 6,376,569 (Oxman et al.) describes a process for the actinic radiation-activated addition reaction of a compound containing silicon-bonded hydrogen with a compound containing aliphatic unsaturation, said addition being referred to as hydrosilylation, the improvement comprising using, as a platinum hydrosilylation catalyst, an ($\eta^5$-cyclopentadienyl) tri($\sigma$-aliphatic)platinum complex, and, as a reaction accelerator, a free-radical photoinitiator capable of absorbing actinic radiation, i.e., light having a wavelength ranging from about 200 nm to about 800 nm. The process can also employ, as a sensitizer, a compound that absorbs actinic radiation, and that is capable of transferring energy to the aforementioned platinum complex or platinum complex/free-radical photoinitiator combination, such that the hydrosilylation reaction is initiated upon exposure to actinic radiation. The process is applicable both to the synthesis of low molecular weight compounds and to the curing of high molecular weight compounds, i.e., polymers.

Combinations of the hydrosilylation catalysts and photocatalysts and/or curing methods may also be used.

The catalyst is typically present in an amount that is effective to catalyze the hydrosilylation reaction. More typically, the catalyst is present in amounts sufficient to provide as little as one part of catalyst, or less, per million parts of the Si—H groups of the silicone polymer. On the other hand, amounts of the catalyst sufficient to provide as high as 1 to 10, or more, parts of catalyst per 1,000 parts of the Si—H groups of the silicone polymer may also be used. All or a portion of the Si—H groups may be functionalized with the perfluoroalkyl group.

In the presence of the hydrosilylation catalyst, hydrosilylation of hydrosilicone of Formula III with the compounds of Formula II readily produce the fluoroalkyl silicones of Formula I in high yield under mild conditions, such as at room temperature. The fluoroalkyl allyl ether of formula II demonstrated high reactivity to hydrosilicones, and the reaction may be controlled by slowly addition of hydrosilicone into the solution of fluoroalkyl allyl ether and catalyst—with or without solvent. In contrary, almost no product was observed from $C_4F_9CH=CH_2$ under similar conditions, indicating the significantly higher reactivity of perfluoroalkyl allyl ether in comparison with perfluoroalkylethylene.

Regarding the product of Formula V of Scheme I, the Si—H functional fluoroalkyl silicones may be used as a crosslinking agent, such as to thermally crosslink with silicones or fluorinated silicones having a plurality of ethylenically unsaturated bonds in a subsequent hydrosilylation reaction. In some embodiments, the fluoroalkyl silicone may be subsequently crosslinked by vinyl substituted silicones: i.e. silicone having a plurality of vinyl groups.

The non-fluorinated organopolysiloxane polymers(vinyl silicones) comprise an average of at least two ethylenically unsaturated organic groups. In some embodiments, the non-fluorinated organopolysiloxane polymer has a vinyl equivalent weight of no greater than 60,000 grams per equivalent, e.g., no greater than 20,000, or even no greater than 10,000 grams per equivalent. In some embodiments, the non-fluorinated organopolysiloxane polymer has a vinyl equivalent weight of 2000 to 5000 grams per equivalent, e.g., 2000 to 4000 grams per equivalent, or even 2500 to 3500 grams per equivalent.

Exemplary non-fluorinated organopolysiloxane polymers include those comprising a triorganosiloxy endblocked polydiorganosiloxane polymer. In some embodiments, the non-fluorinated organopolysiloxane polymer comprises $R_2SiO_{2/2}$ units (i.e., "D" units) and $R_3SiO_{1/2}$ units (i.e., "M" units), wherein each R group independently represents a saturated or ethylenically unsaturated, substituted or unsubstituted hydrocarbon radical, provided that at least two R groups contain terminal ethylenic unsaturation.

The ethylenically unsaturated radicals are independently selected from the group consisting of the vinyl radical and higher alkenyl radicals represented by the formula -R'—CH=CH wherein R' denotes —$(CH_2)_w$—; and w has the value of 1-48.

In some embodiments, trace amounts of non-linear siloxane units, i.e., $SiO_{4/2}$ units (i.e., "Q" units) and $RSiO_{3/2}$ units (i.e., "T" units); wherein R is as described above. In some embodiments, trace amounts of other silicon-bonded radicals, such as hydroxyl and alkoxyl may also be present.

Exemplary non-fluorinated organopolysiloxane polymer comprising an average of at least two ethylenically unsaturated organic groups include those having the formula $M^{vi}D_xM^{vi}$, wherein M represents M units, D represents D units, the superscript "vi" indicates the presence of vinyl-functional groups, and x is the degree of polymerization. Commercially available $M^{vi}D_xM^{vi}$, non-fluorinated organopolysiloxane polymers include those available under the trade designations DMS-V from Gelest Inc. (e.g., DMS-V03, DMS-V05, DMS-V21, DMS-V22, DMS-V25, DMS-V35, and DMS-V41).

Examples of useful silicone having a plurality of vinyl groups include vinyl terminated polydimethylsiloxanes having the formula $H_2C=CHSiMe_2O(SiMe_2O)_n$ SiMe$_2$CH=CH$_2$ (CAS 68083-19-2); vinyl terminated dimethylsiloxane-diphenylsiloxane copolymers having the formula H$_2$C=CHSiMe$_2$(SiMe$_2$O)$_n$(SiPh$_2$O)$_m$SiMe$_2$CH=CH$_2$ (CAS: 68951-96-2); vinyl terminated polyphenylmethylsiloxanes having the formula H$_2$C=CHSiMePhO(SiMePhO)$_n$SiMePhCH=CH$_2$(CAS: 225927-21-9); vinyl-phenylmethyl terminated vinylphenylsiloxane-methylphenylsiloxane copolymers (CAS: 8027-82-1); vinyl terminated trifluoropropylmethylsiloxane-dimethylsiloxane copolymers having the formula H$_2$C=CHSiMePhO(SiMe$_2$O)$_n$(SiMe(CH$_2$CH$_2$CF$_3$)O)$_m$SiMePhCH=CH$_2$ (CAS: 68951-98-4); H$_2$C=CHSiMe$_2$O—(SiMe$_2$O)$_n$(SiMe(CH$_2$CH$_2$CF$_3$)O)$_m$SiMe$_2$CH=CH$_2$, H$_2$C=CHSiMe$_2$O—(SiMe$_2$O)$_n$(SiMe(CH$_2$CH$_2$C$_4$F$_9$)O)$_m$SiMe$_2$CH=CH$_2$, vinyl terminated dimethylsiloxane-diethylsiloxane copolymers having the formula H$_2$C=CHSiMe$_2$O(SiMe$_2$O)$_n$(SiEt$_2$O)$_n$SiMe$_2$CH=CH$_2$; trimethylsiloxy terminated vinylmethylsiloxane-dimethylsiloxane copolymers Me$_3$SiO(SiMe$_2$O)$_n$(SiMe(CH=CH$_2$)O)$_m$SiMe$_3$ (CAS: 67762-94-1); vinyl terminated vinylmethylsiloxane-dimethylsiloxane copolymers having the formula H$_2$C=CH(SiMe$_2$O)$_n$(SiMeCH=CH$_2$O)$_m$ SiMe$_2$CH=CH$_2$ (CAS: 68063-18-1); vinylmethylsiloxane homopolymers (cyclic and linear) having the formula Me$_3$SiO(SiMe(CH=CH$_2$)O)$_n$SiMe3; and vinyl T-structure polymers having the formula MeSi[O(SiMe$_2$O)$_m$SiMe$_2$CH=CH$_2$]$_3$; all commercially available from vendors such as, for example, Gelest, Inc., Morrisville, Pa. or Dow Corning Corp., Midland, Mich. Additional useful silicones having a plurality of vinyl groups include a vinyl-terminated fluorosilicone that is commercially available under the trade designations "SYL-OFF Q2-7785" and "SYL-OFF Q2-7786" from Dow Corning Corp.

In some embodiments, the Si—H group of Formula V, Scheme I may be converted to alkyl groups by subsequent hydrosilylation of an olefin of the formula: CH$_2$=CHCH$_2$—R$^4$, where R$^4$ is H or C$_1$-C$_{50}$ alkyl in the presence of a hydrosilylation catalyst.

Again with regard to the silicone of Formula V, Scheme I, the Si—H groups may be converted to alkoxide groups (Si—H→Si—OR$^4$) and the alkoxy-functional fluoroalkyl silicone can be subsequently crosslinked by siloxane formation. Generally, the hydrides are reacted with an alcohol of the formula R$^4$—OH to convert all or a portion of the Si—H groups to Si—OR$^4$ groups, where R$^4$ is a C$_1$-C$_{50}$ alkyl. Thus the present disclosure provides crosslinkable, fluoroalkyl silicones of the formula:

IV

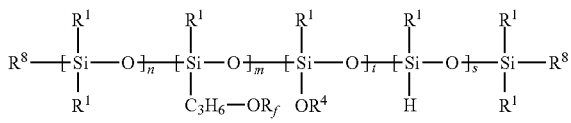

wherein
n is 0 to 2000;
m may be zero, preferably at least one;
s may be zero;
t may be zero, preferably at least one;
R$^8$ is H, alkyl or aryl —(C$_3$H$_6$)—OR$_f$ or OR$^4$, where R$^4$ is C$_1$-C$_{50}$ alkyl;
with the proviso that the silicone contains at least one, preferably at least two Si—OR$^4$ groups and the silicone contains at least one —(C$_3$H$_6$)—OR$_f$ group. In Formula IV, the unit with the subscript t may be at least one, preferably at least two, and/or R$^8$ may be —OR$^4$. Further, if only a portion of the Si—H groups are converted to alkoxysilane groups (Si—OR$^4$), then s may be at least one, and/or a potion of R$^8$ may be H. Further, the unit with the subscript m may be at least one, and/or a portion of the R$^8$ groups may be —(C$_3$H$_6$)—OR$_f$. In some embodiments R$^4$ is lower-chain alkyl (C$_1$-C$_{16}$, preferably C$_1$-C$_4$). In other embodiments R$^4$ is long-chain alkyl (C$_{18}$-C$_{50}$)

Subsequently, these alkoxide groups (Si—OR$^4$) may be hydrolyzed by moisture, then crosslinked by dehydration catalyzed by acid from a photoacid generator (PAG) initiated by photo irradiation, or a thermal acid generator initiated by heating to form siloxane Si—O—Si crosslinked polymers. The acid generator is preferably free of amines or ammonium compounds. The crosslinking of the alkoxide substituted silicones by photo irradiation in the presence of PAG is described in U.S. Pat. No. 6,129,980 or WO 9840439 (Liu et al.), incorporated herein by reference.

The conversion of all or a portion of the Si—H groups in the silicone to alkoxide groups by reacting the hydropolysiloxane with an alcohol in the presence of at least one of a Pd(0) and Pt(0) catalyst according to the methods of U.S. Ser. No. 61/739,277 (Rathore el al.) filed 19 Dec. 2012 and incorporated herein by reference.

A wide variety of acid generating materials can be used in the practice of the invention to catalyze the moisture curing reaction, including onium salts such as sulfonium and iodonium salts. Activating the acid generating material liberates an acid that initiates and accelerates crosslinking of the moisture-curable composition through the formation of Si—O—Si crosslinks. Activation may be accomplished by irradiating the composition with, for example, ultraviolet, visible light, electron beam or microwave radiation. While heat may be used to activate the acid generating material, the compositions of the invention advantageously do not require this and thereby can avoid undesirable damage to heat sensitive substrates.

Although the acid generating material described above is preferred due to the controlled curability it provides, it has been found that condensation catalysts, such as strong organic acids, weak Lewis acids, weak organic bases and metal chelates can also be used in the preparation of the novel silicone pressure-sensitive adhesive. Another preferred class of condensation catalyst is the strong organic acids having pKa values of less than about 3 and the anhydrides and ammonium salts thereof described in U.S. Pat. No. 5,286,815. Examples of useful strong organic acids and derivatives include trichloroacetic acid, cyanoacetic acid, malonic acid, nitroacetic acid, dichloroacetic acid, difluoroacetic acid, trichloroacetic anhydride, dichloroacetic anhydride, difluoroacetic arthydride, triethyl ammonium trichloroacetate, trimethylammonium trichloroacetate, and mixtures thereof.

The condensation catalyst or an acid generating material is used in amounts of about 0.5 to about 20 parts by weight, based on 100 parts by weight of the alkoxy functional silicone.

The fluorosilicone of Formula IV contains both Si—OR$^4$ and Si—H functional groups are dual curable, which may be controllably cured initially via Si—H with a vinyl silicone, then moisture or photo-acid cured from Si—OR$^4$ or vice versa.

The fluorosilicone release materials of Formula I can be blended with one or more additional low surface energy materials (e.g., a fluoropolymer or silicone) while maintaining the desired low release characteristics of the fluorosilicone material, even when the additional low surface energy material itself is not a release material. In addition, in some embodiments, high blend ratios may be used without detrimentally affecting the readhesion force of the adhesive after removal for the blended release materials of the present disclosure.

Exemplary low surface energy materials that may be blended with the fluorosilicone release polymer of Formula I include additional fluorosilicone polymers, including those described herein, as well as non-fluorinated silicones and fluoropolymers.

Fluoropolymers can be prepared from a wide variety of fluorinated ethylenes and non-fluorinated monomers. As used herein, the term "fluorinated" includes both perfluorinated and partially-fluorinated materials.

Generally, any known fluorosilicone release polymer may be used. The term "fluorosilicone" means a silicone material comprising at least some fluorine atoms on a pendent groups (i.e. fluoroalkyl). Exemplary fluorosilicone release coatings include release coating compositions derived from organopolysiloxanes having fluorine containing organic groups and alkenyl groups an organohydrogensiloxane crosslinking agent and a platinum-containing catalyst. Other fluorosilicone release coatings may be derived from, e.g., organopolysiloxanes having fluorine containing organic groups and silicon-bonded hydrogen groups, an alkenyl functional organopolysiloxane and a platinum-containing catalyst.

A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7785 and SYL-OFF Q2-7786. These fluorosilicone polymers are particularly useful in forming release coating compositions when combined with a suitable crosslinking agent. One useful crosslinking agent is available under the SYL-OFF Q2-7560 trade designation from Dow Corning Corp. Other useful crosslinking agents are disclosed in U.S. Pat. Nos. 5,082,706 (Tangney) and 5,578,381 (Hamada et al.). Other fluorosilicone polymers are commercially available from General Electric Co. (Albany, N.Y.), Wacker Chemie (Germany), Akrosil (Menasha, Wis.), and Loparex (Willowbrook, Ill.). Other fluorosilicone polymers are available from Momentive (FSR2000), and Siliconature (Scotchpak 9741 and M117)

One class of fluoropolymers is based upon fluorinated olefinic monomers such as tetrafluoroethylene (TFE), hexafluoropropylene (HFP), vinyl fluoride (VF), vinylidene and fluoride (VDF). In some embodiments, the fluoroolefin-based fluoropolymers may be homopolymers or copolymers of fluorinated olefinic monomers. In some embodiments, the fluoroolefin-based fluoropolymers may be copolymers of one or more fluorinated olefinic monomers and one or more other monomers, including, e.g., non-fluorinated olefins such as ethylene, chlorinated olefins such as chlorotrifluoroethylene, and fluorinated vinyl ethers such as trifluoromethylvinylether.

In some embodiments, the fluoroolefin-based polymers may be amorphous fluoropolymers. As used herein, amorphous fluoropolymers are materials that exhibit essentially no crystallinity or possess no significant melting point as determined for example by differential scanning calorimetry (DSC). In some embodiments, the amorphous fluoropolymers are elastomeric. In some embodiments the elastomeric fluoropolymers may comprise, e.g., interpolymerized units derived from VDF, HFP, and, optionally, TFE monomers. Examples of such are commercially available from 3M Company under the trade names Dyneon™ Fluoroelastomer FC 2145 and FT 2430. Additional amorphous fluoropolymers include, e.g., VDF-chlorotrifluoroethylene copolymers, commercially available under the trade name Kel-F™ 3700, from 3M Company.

In some embodiments, the fluoroolefin-based polymers may be homopolymers and copolymers that do exhibit crystalline melting point. Exemplary crystalline fluoropolymers include those based on fluorinated monomers such as TFE or VDF such as polyvinylidene fluoride (PVDF), available commercially from 3M Company as Dyneon™ PVDF, or thermoplastic copolymers of TFE such as those based on the crystalline microstructure of TFE-HFP-VDF, e.g., those available from 3M under the trade name Dyneon™ Fluoroplastic THV™ 220.

In some embodiments, the fluoroolefin-based polymers may include PVDF-containing fluoroplastic materials having very low molar levels of HFP such as those sold under the trade name Dyneon™ PVDF 6010 or 3100, available from Dyneon LLC, of St. Paul, Minn.; and Kynar™ 740, 2800, 9301, available from Elf Atochem North America Inc.

A separate class of fluoropolymers useful in some embodiments of the present disclosure are fluoroacrylate polymers, which are based upon (meth)aerylates (i.e., acrylates and/or methacrylates) having pendant fluoroalkyl groups. Fluoroacrylate polymers derived from fluoroacrylate monomers and multi-(meth)acrylates such a polyethylene glycol diacrylate (PEGDA) or 1,6-hexanediol diacrylate (HDDA) will form nonlinear (e.g., branched and/or crosslinked) fluoropolymers. Fluoroacrylate polymers derived from fluoroacrylate monomers and mono-(meth)acrylates such as $C_1$-$C_{50}$ acrylates (e.g., $C_4$-$C_{20}$ acrylates such as butyl acrylate, isooctyl acrylate, 2-ethylhexyl acrylate, and octadecyl acrylate) form linear fluoropolymers.

Such fluoroacrylate monomers can be polymerized to yield a fluorinated acrylic polymer as described in U.S. Pat. No. 7,199,197 (Caldwell et al.) and U.S. Pat. No. 7,297,210 (Qui et al). The fluoroacrylate monomers can also be copolymerized with one or more comonomers such as mono-(meth)acrylate monomers to produce linear fluoropolymers according to some embodiments of the present disclosure. In some embodiments, the comonomer may be an alkyl mono-(meth)acrylate. In some embodiments, the alkyl mono-(meth)acrylate is a $C_1$-$C_{50}$, e.g., a $C_4$ to $C_{20}$, alkyl mono-(meth)acrylate. Representative examples of useful alkyl mono-(meth)acrylates include methyl(meth)acrylate, butyl (meth)acrylate, isobutyl (meth)acrylate, hexyl(meth)acrylate, dodecyl(meth)acrylate, octadecyl(meth)acrylate, and 2-ethylhexyl(meth)acrylate.

The ratio of fluoroalkyl silicone release composition to fluoropolymer (e.g., linear fluoroacrylate polymer or fluoroolefinic polymer) can vary widely. For example, in some embodiments, the weight ratio of the fluoroalkyl silicone release polymer of Formula I to the linear fluoropolymer is no greater than 10:1, no greater than 5:1, or even no greater than 3:1. In some embodiments, it may be desirable to minimize the amount of the relatively expensive fluoroalkyl silicone release polymer of Formula I, while retaining the required release and readhesion properties. In some embodiments, the weight ratio of the fluoroalkyl silicone release polymer of Formula I to the linear fluoropolymer is no greater than 1:1, no greater than 1:5, no greater than 1:10, or even no greater than 1:20. For example, in some embodiments the weight ratio of the fluoroalkyl silicone release polymer of Formula I to the linear fluoropolymer is between 10:1 and 1:20, e.g., between 3:1 and 1:20, inclusive; between 2:1 and 1:10, inclusive (e.g., between 1:1 and 1:10, inclusive), or even between 2:1 and 1:3.

In other embodiments, the fluoroalkyl silicone of Formula I may be blended with non-fluorinated silicone polymers, including vinyl-substituted (described supra), hydrogen (Si—H) substituted silicone polymers, and non-functional silicone polymers. As previous described for the vinyl-substituted silicone polymers, the hydrogen-substituted and non-functional silicone polymers may comprise M, D, T and Q units. Vinyl-substituted and hydrogen-substituted (Si—H) silicone polymers are described in U.S. Pat. No. 7,279,210 (Qiu et. al.), incorporated herein by reference.

Coatings

The present disclosure further provides coating compositions comprising the fluorosilicone of Formula I in a suitable solvent. In some embodiments, the disclosure provides crosslinkable coating compositions comprising the fluorosilicone of Formula I and a crosslinking agent in a stable solvent. In other embodiments, the fluoroalkyl silicone of Formula IV, containing hydrolysable Si—$OR^4$ groups, is self-crosslinking by formation of siloxane bonds.

The term "coatable" or "coatable composition" means that the composition is soluble or dispersible in solvents or water and is substantially gel-free and, that it can be applied to a substrate using standard coating methods, and that it forms a film upon heating or curing. The coatable compositions of the invention can be used to impart release properties to a wide variety of substrates.

The coatable compositions are preferably diluted or dispersed in a liquid (for example, water and/or an organic solvent) before coating a substrate. Preferably, the coating compositions contain from about 5 to about 15 percent solids (more preferably, about 2 to about 10 percent), based upon the weight of the coating composition.

The coatable compositions can be applied to fibrous substrates (for example, woven, knit, and non-woven fabrics, textiles, carpets, leather, or paper) to impart water- and oil-repellency. The coatable compositions can be applied to a substrate (or articles comprising a substrate) by standard methods such as, for example, spraying, padding, dipping, roll coating, brushing, or exhaustion.

The composition can then be dried to remove any remaining water or solvent. Preferably, the coated composition is heated to a temperature between about 100° C. and about 175° C. The coatable compositions are useful as release coatings, and can be applied to surfaces requiring release properties from adhesives. Surprisingly, dried coatable compositions of the invention show significant solvent resistance. The coatable compositions can therefore be used as release coatings for solvent cast adhesives.

Substrates suitable for release coatings include, for example, paper, metal sheets, foils, non-woven fabrics, polyolefin coated paper, and films of thermoplastic resins such as polyesters, polyamides, polyolefins, polycarbonates, and polyvinyl chloride. Release coating compositions can be applied to suitable substrates by conventional coating techniques such as, for example, wire-wound rod, direct gravure, offset gravure, reverse roll, air-knife, and trailing blade coating. The resulting release coating compositions can provide effective release for a wide variety of pressure sensitive adhesives such as, for example, natural rubber based adhesives, silicone based adhesives, acrylic adhesives, and other-synthetic film-forming elastomeric adhesives.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Chemical Company, St. Louis, Mo.

| Designation | Material Description and Supplier |
| --- | --- |
| $C_4F_9$—CH=$CH_2$ | available from E. I. du Pont de Nemours, Wilmington, DE under trade designation "ZONYL PFBE FLUOROTELOMER INTERMEDIATE". |
| $C_4F_9$—I | obtained from Sigma-Aldrich Chemical Company, St. Louis, MO. |
| Pt-Cat | (Karstedt catalyst) was bis(1,3-divinyl-1,1,3,3-tetrametyldisiloxane) platinum(0) (2 wt % platinum in xylene), purchased from Gelest Inc., Morrisville, PA and kept in the dark before use. |
| SYL-OFF 7048 | a 100 weight percent solids silane crosslinker (said to comprise methylhydrogen cyclosiloxane, Viscosity-30 centistokes) having H-Si equivalent weight of 60, obtained from Dow Corning Corp., Midland, MI, under the trade designation "Syl-Off™ 7048". |
| SYL-OFF 7678 | a 100 weight percent solids silane crosslinker (said to comprise dimethyl, methylhydrogen siloxane, Viscosity-30 centistokes), obtained from Don Corning Corp., Midland, MI, under the trade designation "Syl-Off™ 7678". |
| Q2-7560 | a 100 wt % crosslinker, obtained from Dow Corning Corp., Midland, MI, under the trade designation "Syl-Off™ Q2-7560". |
| Q2-7785 | a 80 wt % solution of fluorofunctional silicone polymer dispersed in heptane, obtained from Dow Corning Corp., Midland, MI, under the trade designation "Syl-Off™ Q2-7785". |
| 3M Tape 610 | a high performance, transparent cellophane film tape featuring a high tack silicone adhesive commercially available from 3M Company, St. Paul, MN under trade designation "Scotch ® Cellophane Film Tape 610". |

$C_4F_9$—$CH_2CH$=$CH_2$ was prepared from $C_4F_9$—I as discussed in Ameduri, B.; Boutevin, B.; Nouiri, M.; Talbi, M. *J. Fluorine Chem* 1995, 74, 191-197.

$C_4F_9$—O—$CH_2CH$=$CH_2$ was made from $C_3F_7C(O)F$, KF and $CH_2$=$CHCH_2Br$ using the procedure described in Anrong Li et al., *J Org. Chem.*, 1999, 64, 5993 for making $ICF_2CF_2CF_2OCH_2CH$=$CH_2$ from $ICF_2CF_2C(O)F$ and $BrCH_2CH$=$CH_2$. The $C_4F_9$— group was a mixture of n-$C_4F_9$— and i-$C_4F_9$— in mole ratio of 57/43. $^{19}F$ NMR chemical shift of $CF_3CF_2CF_2CF_2O$—$CH_2CH$=$CH_2$: −82.6 (txt, J=9.6 Hz, 2.0 Hz, 3F), −86.8 (m, 2F, $CF_2O$), −127.2 (m, 2F), −127.5 (m, 2F) ppm; $(CF_3)_2CFCF_2O$—$CH_2CH$=$CH_2$: −74.7 (txd, Jt=12.64 Hz, Jd=5.75 Hz, 6F), −80.6 (m, 2F, $CF_2O$), −188.2 (m, 1F) ppm.

Since a series of $R_fC(O)F$ could be made by ECF process, this reaction provided a cheap, process for making $R_f$—$OCH_2CH$=$CH_2$ with variety of different $R_f$ groups.

Test Methods

Method For % Extractable Silicone Test

Unreacted silicone extractables were measured on cured thin film formulations of Example and Comparative Example samples described below to ascertain the extent of silicone crosslinking immediately after the coatings were cured. The percent extractable silicone, (i.e., the unreacted silicone extractables), a measure of the extent of silicone cure on a release liner, was measured by the following method: The silicone coat weight of a 3.69 centimeter diameter sample of coated substrate was determined by comparing samples of coated and uncoated substrates using an EDXRF spectrophotometer (obtained from Oxford Instruments, Elk Grove Village, Ill. under trade designation OXFORD LAB X3000). The coated substrate sample was then immersed in and shaken with methyl isobutyl ketone (MIBK) for 5 minutes, removed, and allowed to dry. The silicone coating weight was measured again. Silicone extractables were attributed to the weight difference between the silicone coat weight before and after extraction with MIBK as a percent using the following formula:

Extractable Silicone %=$(a-b)/a*100\%$

Where a=initial coating weight (before extraction with MIBK); and b=final coating weight (after extraction with MIBK).

Method for Release Test

Release Test

An IMASS SP2000 slip peel tester (obtained from IMASS Inc., Accord, Mass.) was used for all release tests. Tests were performed at 21° C. at 50% RH. A piece of 2.54 cm wide 3M Tape 610 was laminated to the sample coatings with a 2 kg rubber roller, then peeled at an angle of 180° at the speed of 2.29 m per minute in 5 seconds. Typically, 3 measurements were made and the mean reported.

Re-Adhesion Test on Stainless Steel

The 3M Tape 610 strips peeled in the Release test were laminated to a steel plate with a 2 kg rubber roller. An IMASS SP2000 slip peel tester was used to peel the tape at an angle of 180° at the speed of 30 cm per minute in 10 seconds. Typically, 3 measurements were made and the mean reported.

Method for Determining Contact Angle

Coated films prepared in Examples and Coated Examples described below were rinsed for 1 minute with hand agitation in an isopropanol (IPA) bath prior to water and hexadecane (HD) contact angles measurements. Measurements were made using a VCA-2500XE video contact angle analyzer (available from AST Products, Billerica, Mass.). Reported values are the average of at least 3 drops; each drop was measured twice. Drop volumes were 5 μL for static measurements and 1-3 μL for advancing and receding. For HD, only advancing and receding contact angles are reported because static and advancing values were found to be nearly equal.

Example 1 (EX1)

Preparation of —[SiMe($C_3H_6OC_4F_9$)—O]n-[SiMeH—O]m-, n/m=17/83

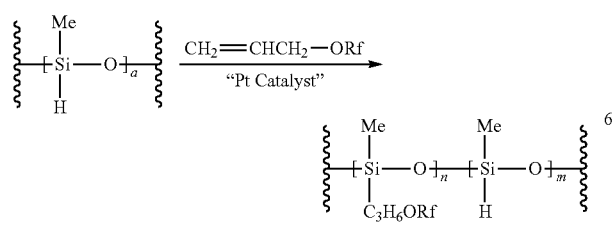

Under $N_2$, Pt-Cat (40 ppm) and $C_4F_9OCH_2CH=CH_2$ (4 g, MW=276, 14.5 mmol) was mixed together in a 100 mL round bottom flask followed by drop wise addition of the SYL-OFF 7048 (5 g, EW~60, 83.3 meq H—Si) through a dropping funnel at room temperature. The addition of SYL-OFF 7048 resulted in the evolution of heat after 20-60 seconds of stirring. The mixture was continued to be stirred for additional 30 minutes at room temperature, followed by the analysis of the mixture by FT-IR, where Si—H signal at ~2160 $cm^{-1}$ reduced and $^1H$ NMR where Si—H signal at ~4.5 ppm reduced and $CH_2=CH$— signal disappeared. From $^{19}F$ NMR analysis, very limited change was observed for $C_4F_9$—O— signal, including the ratio of n-$C_4F_9$— and i-$C_4F_9$— (n-/i-$C_4F_9OCH_2CH=CH_2$ and n-/i-$C_4F_9OCH_2CH_2CH_2$-Silicone). To isolate the product low boiling point residuals were stripped out under full vacuum. Isolated yield was 99% and the ratio of n:m was 17:83 based on the ratio of Si—H and O—$CH_2$ from $^1H$ NMR. Chemical shift of $^1H$-NMR: 4.57 (—SiH); 3.81 (broad, —$OCH_2$); 1.59 (b), 1.24 (b), 0.82 (broad), 0.45 (broad); 0.01 (broad, —$SiCH_3$) ppm, indicating two isomers of hydrosilylation with pendent group of —$CH_2CH_2CH_2OC_4F_9$ and —CH($CH_3$)$CH_2OC_4F_9$.

Example 2 (EX2)

Preparation of —[SiMe($C_3H_6OC_4F_9$)—O]n-[SiMeH—O]m-, n/m=30/70

EX2 was prepared in the same manner as EX1, except that nonafluorobutyl allyl ether (7.5 g, MW=276, 27.17 mmol) was used. Yield—99% and the ratio of n:m was 30:70. Chemical shift of $^1H$-NMR: 4.57 (—SiH); 3.81 (broad, —$OCH_2$); 1.59 (b), 1.24 (b), 0.82 (broad), 0.45 (broad); 0.01 (broad, —$SiCH_3$) ppm.

Example 3 (EX3)

Preparation of —[SiMe($C_3H_6OC_4F_9$)—O]n-[SiMeH—O]m-, n/m=50/50

EX3 was prepared in the same manner as EX1, except that nonafluorobutyl allyl ether (12 g, MW=276, 43.47 mmol) was used. Yield—99% and the ratio of n:m was 50:50. Chemical shift of $^1H$-NMR: 4.57 (—SiH); 3.81 (broad, —$OCH_2$); 1.59 (b), 1.24 (b), 0.82 (broad), 0.45 (broad); 0.01 (broad, —$SiCH_3$) ppm.

Example 4 (EX4)

Preparation of —[SiMe($C_3H_6OC_4F_9$)—O]n-[SiMeH—O]m-, n/m=100/0

EX4 was prepared in the same manner as EX1, except that nonafluorobutly allyl ether (23.5 g, MW=276, 85.14 mmol) was used. Yield—99% and the ratio of n:m is 100:0. Chemical shift of $^1H$-NMR: 3.81 (broad, —$OCH_2$); 1.59 (b), 1.24 (b), 0.82 (broad), 0.45 (broad); 0.01 (broad, —$SiCH_3$) ppm.

Example 5 (EX5)

Preparation of —[SiMe($C_3H_6OC_4F_9$)—O]p-[SiMeH—O]q-[$SiMe_2$—O]n-, p/q/n=15/50/35

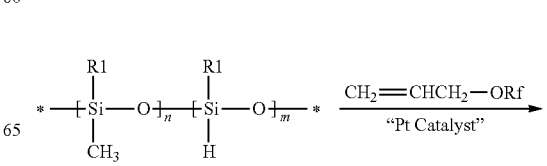

-continued

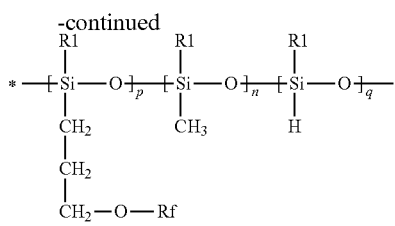

Under N$_1$, Pt-Cat (40 ppm) and nonafluorobutyl allyl ether (3 g, MW=276, 10.87 mmol) was mixed together in a 100 mL round bottom flask followed by drop wise addition of the SYL-OFF 7678 (5 g) through a dropping funnel at room temperature. The addition of SYL-OFF 7048 resulted in the evolution of heat after 20-60 seconds of stirring. The mixture was continued to be stirred for additional 30 minutes followed by the analysis of mixture by FT-IR where Si—H signal at ~2160 cm$^{-1}$ reduced and $^1$H NMR where Si—H signal at ~4.5 reduced. To isolate the product, all low boiling point residuals were stripped out under foil vacuum. Yield—99% and the ratio of p/q/n=15/50/35. Chemical shift of $^1$H-NMR: 4.57 (—SiH); 3.81 (broad, —OCH$_2$); 1.59 (b), 1.24 (b), 0.82 (broad), 0.45 (broad); 0.01 (broad, —SiCH$_3$) ppm.

Example 6 (EX6)

Preparation of —[SiMe(C$_3$H$_6$OC$_4$F$_9$)—O]n-[SiMe(OEt)—O]m-, n/m=30/70

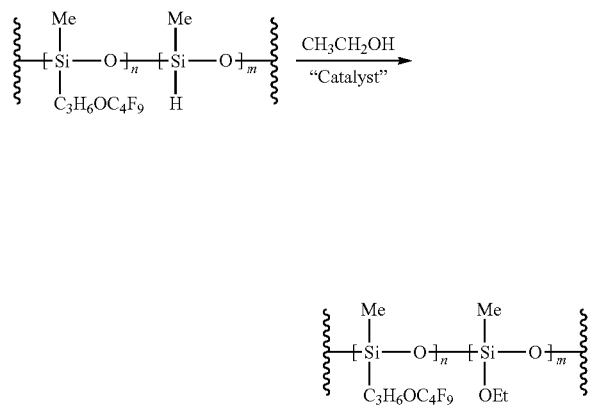

Product of EX2 (2.5 g) was mixed with excess anhydrous ethanol (2.5 g) in a 50 mL round bottom flask followed by the addition of 5 wt % Pd/charcoal (0.004 g) at room temperature under nitrogen. The addition of Pd on charcoal resulted in rapid evolution of hydrogen gas signifying the substitution of ethoxy groups. After 4-5 hrs of stirring at room temperature, the completion of reaction was confirmed by the FT-IR where Si—H signal at ~2160 cm$^{-1}$ disappeared and $^1$H NMR where Si—H signal at ~4.5 disappeared. To isolate the product, Pd/charcoal was filtered through 1 micron-glass filter and any unreacted ethanol residual was removed under full vacuum. Chemical shift of $^1$H-NMR; 3.81 (broad, —OCH$_2$); 3.6 (b, —OCH$_2$), 1.59 (b), 1.24 (b), 1.20 (b, CH$_3$); 0.82 (broad); 0.45 (broad); 0.01 (broad, —SiCH$_3$) ppm.

Comparative Example A (CE-A)

Preparation of —[SiMe(C$_2$H$_4$C$_4$F$_9$)—O]n-[SiMeH—O]m- from —[SiMeH—O]m+n- and n-C$_4$F$_9$CH=CH$_2$

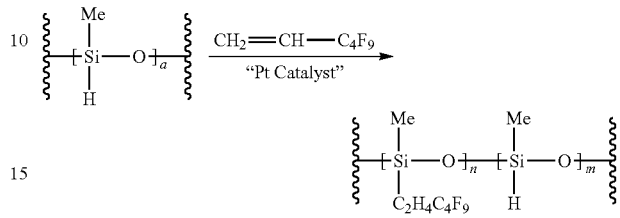

Under N$_2$, Pt-Cat (40 ppm) and n-C$_4$F$_9$CH=CH$_2$ (5 g, MW=246, 20.3 mmol) was mixed together in a 100 mL round bottom flask followed by drop wise addition of the SYL-OFF 7048 (5 g, EW of H—Si=60, 83.3 meq) through a dropping funnel at room temperature. After addition, the reaction mixture was stirred at room temperature for 4 hrs. Then, the mixture was analyzed by FT-IR where almost no reduction in Si—H signal at ~2160 cm$^{-1}$ was observed and $^1$H NMR where insignificant Si—H signal reduction at ~4.5 was observed. Yield—<5%.

Repeating above reaction with more Pt-Cat at 80 ppm resulted in gelation of SYL-OFF 7048.

Comparative Example B (CE-B)

Preparation of —[SiMe(C$_3$H$_6$C$_4$F$_9$)—O]n-[SiMeH—O]m- from —[SiMeH—O]$_{m+n}$- and n-C$_4$F$_9$CH$_2$CH=CH$_2$

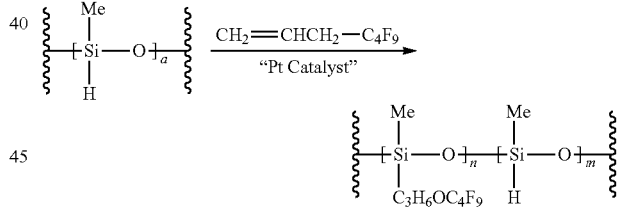

Under N$_2$, Pt-Cat (40 ppm) and nonafluoro heptene-1 (5 g, MW=260, 19.23 mmol) were mixed together in a 100 mL round bottom flask followed by drop wise addition of the SYL-OFF 7048 (5 g, EW of H—Si=60, 83.3 meq) through a dropping funnel at room temperature. The mixture was continued to be stirred for 3-4 hrs at room temperature after addition, then analyzed by FT-IR and $^1$H NMR, no significant change was observed for Si—H signals at ~2160 cm$^{-1}$ (FT-IR) and ~4.5 ppm (H-NMR). Yield was less than 5%.

Example 7 (EX7) and Comparative Example C (CE-C)

For EX7, 10 g SYL-OFF Q2-7785 was diluted with 20 g of mixed solvent of heptane/ethyl acetate in ratio of 80/20 by weight, then 0.80 g polymer prepared in EX-2 was added. The resulting formulation was thoroughly mixed and was coated on a 2-mil (0.058 millimeter (mm)) thick polyester terephthalate (PET) film (obtained from Mitsubishi Polyester Film, Greer, S.C., under the trade designation "Hostaphan™ 3SAB", which has one side chemically treated or primed to improve the adhesion of silicone coatings) with a No#7 Mayer bar (corresponding to a coating weight of 1.7 g/m$^2$). The coated layer was cured at 116° C. for 60 seconds in an oven equipped with solvent exhaust.

The (%) silicone extractables of the resulting coating was 8.2% when tested as described above.

CE-C was prepared in the same manner as EX7 except that 10 g SYL-OFF Q2-7785 was diluted with 20 g of mixed solvent of heptane/ethyl acetate (80/20 by weight), then added 0.6 g SYL-OFF Q2-7560. The resulting formulation was thoroughly mixed and was coated on a 2-mil (0.058 millimeter (mm)) thick polyester terephthalate (PET) film. The (%) silicone extractables of the resulting coating was 8.0% when tested as described above.

Examples 8-10 (EX8-EX10) and Comparative Examples D-F (CE-D-CE-F)

EX8-EX10 were prepared in the same manner as EX7, except that No #6, 4, 3 Mayer bars, respectively, were used corresponding to resulting coating weights of 1.3 g/m$^2$, 0.86 g/m$^2$, and 0.65 g/m$^2$, respectively.

CE-D-CE-F were prepared in the same manner as CE-C, except that No #6, 4, 3 Mayer bars, respectively, were used corresponding to resulting coating weights of 1.3 g/m$^2$, 0.86 g/m$^2$, and 0.65 g/m$^2$, respectively.

Samples prepared above for EX7-EX10 and CE-D-CE-F were tested for their release, readhesion and water and HD contact angles using the methods described above. The data are summarized below in Tables 1-4, below.

TABLE 1

| Example | Measurement | Release (N/dm) | Readhesion (N/dm) | Release type |
|---|---|---|---|---|
| 3M Tape 610 | 1 | N/A | 24.64 | |
| | 2 | N/A | 25.16 | |
| | 3 | N/A | 25.26 | |
| | Average | N/A | 25.02 | |

TABLE 1-continued

| Example | Measurement | Release (N/dm) | Readhesion (N/dm) | Release type |
|---|---|---|---|---|
| EX7 | 1 | 0.10 | 24.50 | Smooth |
| | 2 | 0.12 | 21.85 | |
| | 3 | 0.11 | 25.77 | |
| | Average | 0.11 | 24.04 | |
| EX8 | 1 | 0.12 | 24.74 | Smooth |
| | 2 | 0.12 | 23.59 | |
| | 3 | 0.15 | 24.03 | |
| | Average | 0.13 | 24.12 | |
| EX9 | 1 | 0.16 | 21.61 | Smooth |
| | 2 | 0.17 | 20.66 | |
| | 3 | 0.17 | 22.64 | |
| | Average | 0.17 | 21.64 | |
| EX10 | 1 | 0.18 | 23.65 | Smooth |
| | 2 | 0.19 | 21.43 | |
| | 3 | 0.22 | 24.18 | |
| | Average | 0.19 | 24.64 | |

N/A means not applicable

TABLE 2

| Example | Measurement | Release (N/dm) | Readhesion (N/dm) | Release type |
|---|---|---|---|---|
| CE-D | 1 | 0.23 | 22.39 | Smooth |
| | 2 | 0.22 | 22.87 | |
| | 3 | 0.17 | 25.57 | |
| | Average | 0.21 | 23.61 | |
| CE-E | 1 | 0.25 | 23.11 | Smooth |
| | 2 | 0.28 | 23.92 | |
| | 3 | 0.30 | 23.87 | |
| | Average | 0.27 | 23.64 | |
| CE-F | 1 | 0.18 | 22.99 | Smooth |
| | 2 | 0.20 | 23.70 | |
| | 3 | 0.21 | 22.97 | |
| | Average | 0.20 | 23.22 | |

TABLE 3

| | | Water contact angle (degrees) | | | | | | HD contact angle (degrees) | | | | | |
|---|---|---|---|---|---|---|---|---|---|---|---|---|---|
| | | Advancing | | Receding | | Static | | Advancing | | Receding | | Static | |
| Example | Measurement | Left | Right | Left | Right | Left | Right | Left | Right | Left | Right | Left | Right |
| EX 7 | 1 | 113.0 | 113.0 | 96.6 | 96.6 | 110.3 | 110.3 | 44.9 | 44.9 | 31.8 | 31.8 | 40.5 | 40.5 |
| | 2 | 113.7 | 113.7 | 96.5 | 96.5 | 110.2 | 110.2 | 44.9 | 44.9 | 31.7 | 31.7 | 40.4 | 40.4 |
| | 3 | 113.0 | 113.0 | 96.0 | 96.0 | 110.8 | 110.8 | 45.0 | 45.0 | 31.4 | 31.4 | 40.3 | 40.3 |
| | Average | 113.2 | 113.2 | 96.4 | 96.4 | 110.4 | 110.4 | 44.9 | 44.9 | 31.6 | 31.6 | 40.4 | 40.4 |
| EX 8 | 1 | 114.8 | 114.8 | 92.5 | 92.5 | 108.5 | 109.6 | 45.9 | 45.9 | 32.7 | 32.7 | 39.6 | 40.1 |
| | 2 | 115.6 | 115.6 | 91.3 | 91.3 | 108.6 | 109.2 | 45.5 | 45.5 | 32.7 | 32.7 | 39.5 | 40.0 |
| | 3 | 114.7 | 114.7 | 91.4 | 91.4 | 109.7 | 109.7 | 45.8 | 45.8 | 31.6 | 31.6 | 39.5 | 39.8 |
| | Average | 115.0 | 115.0 | 91.7 | 91.7 | 108.9 | 109.5 | 45.7 | 45.7 | 32.3 | 32.3 | 39.5 | 40.0 |
| EX 9 | 1 | 117.6 | 115.3 | 91.7 | 91.7 | 108.1 | 108.1 | 47.7 | 47.7 | 30.0 | 30.0 | 42.4 | 42.4 |
| | 2 | 116.2 | 116.0 | 92.1 | 92.1 | 107.5 | 107.5 | 48.4 | 48.4 | 30.5 | 30.5 | 41.7 | 41.7 |
| | 3 | 116.4 | 116.1 | 92.5 | 92.5 | 107.1 | 107.1 | 48.7 | 48.7 | 30.1 | 30.1 | 41.9 | 41.9 |
| | Average | 116.7 | 115.8 | 92.1 | 92.1 | 107.6 | 107.6 | 48.3 | 48.3 | 30.2 | 30.2 | 42.0 | 42.0 |
| EX 10 | 1 | 116.9 | 116.9 | 93.6 | 93.6 | 110.4 | 110.4 | 47.4 | 47.4 | 34.8 | 34.8 | 41.9 | 41.9 |
| | 2 | 117.7 | 117.7 | 92.5 | 92.5 | 110.1 | 110.1 | 47.9 | 47.9 | 33.6 | 33.6 | 42.0 | 42.0 |
| | 3 | 117.4 | 117.4 | 93.1 | 93.1 | 110.1 | 110.1 | 47.8 | 47.8 | 32.6 | 32.6 | 42.0 | 42.0 |
| | Average | 117.3 | 117.3 | 93.1 | 93.1 | 110.2 | 110.2 | 47.7 | 47.7 | 33.7 | 33.7 | 42.0 | 42.0 |

TABLE 4

| | | Water contact angle (degrees) | | | | | | HD contact angle (degrees) | | | | | |
| | | Advancing | | Receding | | Static | | Advancing | | Receding | | Static | |
| Example | Measurement | Left | Right | Left | Right | Left | Right | Left | Right | Left | Right | Left | Right |
|---|---|---|---|---|---|---|---|---|---|---|---|---|---|
| CE-D | 1 | 117.1 | 117.1 | 96.9 | 96.9 | 114.2 | 114.2 | 48.2 | 47.5 | 33.8 | 33.9 | 44.1 | 43.1 |
| | 2 | 116.7 | 116.7 | 97.7 | 97.7 | 114.5 | 114.5 | 48.4 | 47.4 | 33.7 | 32.7 | 44.5 | 43.3 |
| | 3 | 117.4 | 117.4 | 96.9 | 96.9 | 114.8 | 114.8 | 48.3 | 47.4 | 32.8 | 31.9 | 44.5 | 43.2 |
| | Average | 117.1 | 117.1 | 97.2 | 97.2 | 114.5 | 114.5 | 48.3 | 47.4 | 33.4 | 32.8 | 44.4 | 43.2 |
| CE-E | 1 | 116.4 | 116.0 | 96.3 | 96.3 | 113.0 | 113.0 | 47.0 | 47.0 | 31.2 | 31.2 | 40.4 | 40.4 |
| | 2 | 116.3 | 115.9 | 97.1 | 97.2 | 113.3 | 113.3 | 47.1 | 47.1 | 30.9 | 30.9 | 40.2 | 40.2 |
| | 3 | 116.0 | 115.9 | 96.5 | 96.5 | 113.0 | 113.0 | 47.0 | 47.0 | 31.1 | 31.1 | 40.5 | 40.5 |
| CE-F | Average | 116.2 | 115.9 | 96.7 | 96.7 | 113.1 | 113.1 | 47.0 | 47.0 | 31.1 | 31.1 | 40.4 | 40.4 |
| | 1 | 115.4 | 115.4 | 95.9 | 95.9 | 111.2 | 111.2 | 47.9 | 48.4 | 34.1 | 34.1 | 42.0 | 43.2 |
| | 2 | 115.8 | 115.8 | 96.8 | 96.8 | 111.1 | 111.1 | 47.9 | 48.7 | 34.4 | 34.4 | 42.0 | 42.8 |
| | 3 | 116.0 | 116.0 | 96.1 | 96.1 | 110.7 | 110.7 | 47.9 | 48.4 | 34.4 | 34.4 | 42.0 | 42.4 |
| | Average | 115.7 | 115.7 | 96.3 | 96.3 | 111.0 | 111.0 | 47.9 | 48.5 | 34.3 | 34.3 | 42.0 | 42.8 |

This disclosure provides the following embodiments:

1. A fluoroalkyl silicone of the formula:

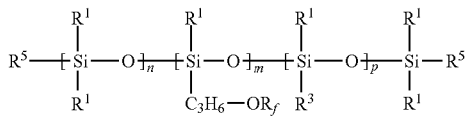

wherein
each $R^1$ is independently an alkyl or aryl;
$R_f$ is perfluoroalkyl of the formula
—$CF_2$—$C_qF_{2q}$—X—$C_rF_{2r}$—F, where q and r are independently 0 to 4,
X is a covalent bond, —O—, or —$NR_f^1$ where $R_f^1$ is $C_1$-$C_3$ perfluoroalkyl;
$R^3$ is —H, —$OR^4$, or —$(CH_2)_3$—$R^4$, where $R^4$ is $C_1$-$C_{50}$ alkyl;
n is 0 to 2000;
m may be zero;
p may be zero, and n+p is at least one;
$R^5$ is H, alkyl, aryl —$(C_3H_6)$—O—$R_f$, or $R^3$;
wherein the fluoroalkyl silicone has at least one $R_f$ group.

2. The fluoroalkyl silicone of embodiment 1, wherein $R_f$ is selected from —$CF_3$, —$CF_2CF_3$, —$CF_2C_2F_5$, —$CF_2C_3F_7$, —$CF_2C_4F$, —$C_2C_5F_{11}$, $CF_3O(CF_2)_2CF_2$—, $(CF_3)_2N(CF_2)_2CF_2$—, —$CF_2CF(CF_3)_2$ and $C_3F_7OCF(CF_3)CF_2$—.

3. The fluoroalkyl silicone of any of the previous embodiments where the ratio of n to m is greater than one.

4. The fluoroalkyl silicone of any of the previous embodiments where the ratio of n to m is greater than ten.

5. The fluoroalkyl silicone of any of the previous embodiments having a Mw of at least 200.

6. The fluoroalkyl silicone of any of the previous embodiments wherein m is at least 2.

7. The fluoroalkyl silicone of any of the previous embodiments wherein $R^5$ is —$(C_3H_6)$—O—$R_f$.

8. The fluoroalkyl silicone of any of embodiments 1 to 6 wherein p is at least 1 and $R^3$ is H.

9. The fluoroalkyl silicone of any of embodiments 1 to 6 wherein p is at least 1 and $R^3$ is —O—$R^4$, where $R^4$ is $C_1$-$C_4$ alkyl.

10. The fluoroalkyl silicone of any of embodiments 1 to 6 wherein p is at least 1 and $R^3$ is —$(C_2H_4)$—R', where R' is $C_1$-$C_{48}$ alkyl.

11. The fluoroalkyl silicone of any of the previous embodiments wherein n is 10 to 2000.

12. The fluoroalkyl silicone of any of the previous embodiments wherein $R_f$ contains 1 to 8 perfluorinated carbon atoms.

13. The fluoroalkyl silicone of any of the previous embodiments wherein $R_f$ contains 2 to 6 perfluorinated carbon atoms.

14. The fluoroalkyl silicone of any of the previous embodiments wherein the ratio of m to p is 100:0 to 10:90.

15. A method of making the fluoroalkyl silicone of an of the previous embodiments comprising:
hydrosilylation the presence of a hydrosilylation catalyst of a perfluoroalkyl allyl ether of the formula:
$R_f$—$OCH_2CH$=$CH_2$, where $R_f$ is perfluoroalkyl of the formula
—$CF_2$—$C_qF_{2q}$—X—$C_rF_{2r}$—F, where q and r are independently 0 to 4;
with a hydrosilicone of the formula:

$$R^6 \mathrm{-\!\!\!+\!\!Si-O\!+\!\!}_n\mathrm{\!\!+\!\!Si-O\!+\!\!}_q\mathrm{\!\!Si-R^6},$$

where
each $R^1$ is independently an alkyl or aryl;
n is 0 to 2000; and
q may be zero;
$R^6$ is H, alkyl or aryl,
with the proviso that the hydrosilicone contains at least one Si—H group.

16. The method of embodiment 15 wherein the perfluoroalkyl allyl ether is prepared by allylation of $R_f'C(O)F$ with an allylation agent in the presence of fluoride ion, where $R_f'$ is a $C_1$-$C_8$ perfluoroalkyl group.

17. The method of embodiment 16 wherein the $R_f'C(O)F$ is prepared by electrochemical fluorination of a non-fluorinated carboxylic acid derivative in anhydrous HF.

18 The method of embodiment 15 wherein the hydrosilylation product is of the formula:

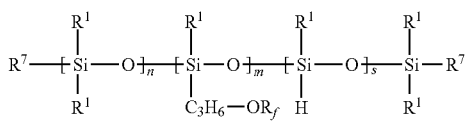

where
n is 0 to 2000;
m may be zero;
s may be zero to 2000;
$R^7$ is H, alkyl, aryl or —$(C_3H_6)$—$OR_f$
o is 1;
with the proviso that the silicone contains at least one Si—H group and at least one —$(C_3H_6)$—O—$R_f$ group.

19. The method of embodiment 18 comprising the further step of alkoxylation of the Si—H groups with an alcohol of the formula $R^4$—OH, where $R^4$ is $C_1$-$C_4$ alkyl.

20. The product of embodiment 19 of the formula:

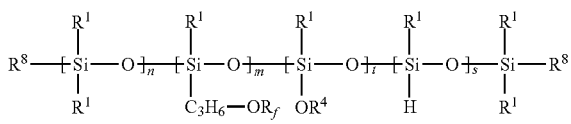

wherein
n is 0 to 2000;
m is at least one;
s may be zero;
t may be zero;
$R^8$ is H, alkyl or aryl or $OR^4$, where $R^4$ is H or $C_1$-$C_{15}$ alkyl;
t may be zero;
with the proviso that the silicone contains at least one, preferably at least, two Si—$OR^4$ groups and at least 1 Si—H group.

21. The method of embodiment 18 comprising the further step of hydrosilylation of the Si—H groups with a compound of the formula $CH_2$=CH—$R^4$, where $R^4$ is $C_1$-$C_{50}$ alkyl in the presence of a hydrosilylation catalyst.

22. The method of embodiment 21 providing a silicone of the formula:

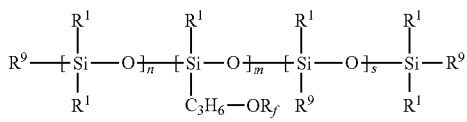

wherein
n is 0 to 2000;
m is at least one;
s may be zero;
$R^9$ is alkyl, aryl or —$(C_3H_6)$—$R^4$, where $R^4$ is $C_1$-$C_{50}$ alkyl;
with the proviso that the silicone contains at least one —$(C_3H_6)$—$R^4$ group.

23. The method of embodiment 18 comprising the further step of crosslinking the silicone with a vinyl silicone polymer.

24. A release liner comprising a backing and a layer of the cured coating of the fluoroalkyl silicone of any of embodiments 1-14 on at least one major surface of the backing.

25. The release liner of embodiment 24 wherein at least one of $R^5$ and $R^3$ of the fluoroalkyl silicone is —$OR^4$, where $R^4$ is $C_1$-$C^4$ alkyl.

26. The release liner of embodiment 25, wherein the fluoroalkyl silicone is moisture cured.

27. The release liner of embodiment 24, wherein at least one of $R^5$ and $R^3$ of the fluoroalkyl silicone is H, cured with a vinyl silicone.

28. The release liner of embodiment 24 wherein at least one of $R^5$ and $R^3$ of the fluoroalkyl silicone is H, and at least one of $R^5$ and $R^3$ of the fluoroalkyl silicone is —$OR^4$ and is cured by hydrosilylation with a vinyl silicone, and moisture or photo-acid cured from Si—$OR^4$.

29. The release liner of embodiment 25, wherein the fluoroalkyl silicone is photo irradiation cured in the presence of a photoacid generator.

30. An adhesive article comprising (I) a release liner comprising a backing and a cured release coating comprising the fluoroalkyl silicone of any of embodiments 1-14 on at least one surface of the backing, and (II) a pressure-sensitive adhesive in contact with a surface of the release liner.

31. The adhesive article of embodiment 30, further comprising a second backing adhered to the adhesive surface on the opposite surface of the release liner.

32. The adhesive article according to any one of embodiments 30 or 31, wherein the adhesive comprises a silicone adhesive.

33. The adhesive article according to any one of embodiments 31 to 32, wherein the adhesive comprises an acrylate adhesive.

34. A coatable release solution comprising the fluorosilicone of any if embodiments 1-14 and a solvent.

35. The coatable release solution of embodiments 34 further comprising a non-fluorinated organopolysiloxane polymer.

36. The coatable release solution of embodiment 34 further comprising a linear fluoropolymer.

37. The coatable release solution of embodiment 36 wherein the linear fluoropolymer is a fluoroalkyl acrylate polymer.

The invention claimed is:

1. A fluoroalkyl silicone of the formula:

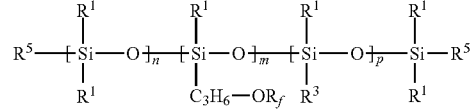

wherein
each $R^1$ is independently an alkyl or aryl;
$R_f$ is perfluoroalkyl of the formula —$CF_2$—$C_qF_{2q}$—X—$C_rF_{2r}$—F, where q and r are independently 0 to 4,
X is a covalent bond, —O—, or —$NR_f^1$ where $R_f^1$ is $C_1$-$C_3$ perfluoroalkyl;
$R^3$ is —H, —$OR^4$, or —$(CH_2)_3$—$R^4$, where $R^4$ is $C_1$-$C_{50}$ alkyl;
n is 0 to 2000;
m may be zero;
p may be zero, and n+p is at least one;
$R^5$ is H, alkyl, aryl —$(C_3H_6)$—O—$R_f$ or $R^3$;
wherein the fluoroalkyl silicone has at least one —$(C_3H_6)$—O—$R_f$ group.

2. The fluoroalkyl silicone of claim 1 where the ratio of n to m is greater than one.

3. The fluoroalkyl silicone of claim 1 where the ratio of n to m is greater than ten.

4. The fluoroalkyl silicone of claim 1 wherein m is at least 2.

5. The fluoroalkyl silicone of claim 1 wherein $R^5$ is $-(C_3H_6)-O-R_f$.

6. The fluoroalkyl silicone of claim 1 wherein p is at least 1 and $R^3$ is H.

7. The fluoroalkyl silicone of claim 1 wherein p is at least 1 and $R^3$ is $-O-R^4$, where $R^4$ is $C_1$-$C_4$ alkyl.

8. The fluoroalkyl silicone of claim 1 wherein p is at least 1 and $R^3$ is $-(C_2H_4)-R'$, where R' is $C_1$-$C_{48}$ alkyl.

9. The fluoroalkyl silicone of claim 1 wherein $R_f$ contains 2 to 6 perfluorinated carbon atoms.

10. The fluoroalkyl silicone of claim 1 wherein the ratio of m to p is 100:0 to 10:90.

11. A method of making the fluoroalkyl silicone of claim 1, comprising
hydrosilylation in the presence of a hydrosilylation catalyst of a perfluoroalkyl allyl ether of the formula:
$R_f-OCH_2CH=CH_2$, where $R_f$ is perfluoroalkyl of the formula
$-CF_2-C_qF_{2q}-X-C_rF_{2r}-F$, where q and r are independently 0 to 4; X is a covalent bond, $-O-$, or $NR_f^1$, where $R_f^1$ is a $C_1$-$C_{50}$ alkyl,
with a hydrosilicone of the formula:

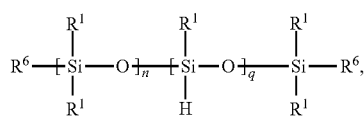

where
each $R^1$ is independently an alkyl or aryl;
n is 0 to 2000; and
q may be zero;
$R^6$ is H, alkyl or aryl,
with the proviso that the hydrosilicone contains at least one Si—H group.

12. The method of claim 11 wherein the hydrosilylation product is of the formula:

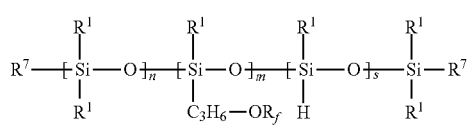

where
n is 0 to 2000;
m may be zero;
s may be zero to 2000;
$R^7$ is H, alkyl, aryl or $-(C_3H_6)-OR_f$
o is 1;
with the proviso that the silicone contains at least one Si—H group and at least one $-(C_3H_6)-O-R_f$ group.

13. The method of claim 12 comprising the further step of alkoxylation of the Si—H groups with an alcohol of the formula $R^4-OH$, where $R^4$ is $C_1$-$C_4$ alkyl.

14. A product made by the method claim 13 of the formula:

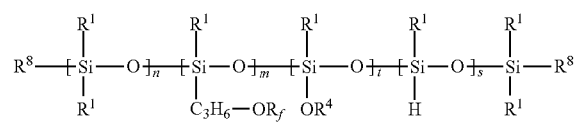

wherein
n is 0 to 2000;
m is at least one;
s may be zero;
t may be zero;
$R^8$ is H, alkyl or aryl or $OR^4$, where $R^4$ is H or $C_1$-$C_{15}$ alkyl;
t may be zero;
with the proviso that the silicone contains at least one, preferably at least two Si—$OR^4$ groups and at least 1 Si—H group.

15. The method of claim 12 comprising the further step of hydrosilylation of the Si—H groups with a compound of the formula $CH_2=CH-R^4$, where $R^4$ is $C_1$-$C_{50}$ alkyl in the presence of a hydrosilylation catalyst.

16. A product made by the method of claim 15 of the formula:

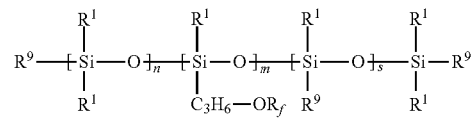

wherein
n is 0 to 2000;
m is at least one;
s may be zero;
$R^9$ is alkyl, aryl or $-(C_3H_6)-R^4$, where $R^4$ is $C_1$-$C_{50}$ alkyl;
with the proviso that the silicone contains at least one $-(C_3H_6)-R^4$ group.

17. The method of claim 12 comprising the further step of crosslinking the silicone with a vinyl silicone polymer.

18. A release liner comprising a backing and a layer of the cured coating of the fluoroalkyl silicone of claim 1 on at least one major surface of the backing.

19. The release liner of claim 18 wherein at least one of $R^5$ and $R^3$ of the fluoroalkyl silicone is $-OR^4$, where $R^4$ is $C_1$-$C_4$ alkyl.

20. The release liner of claim 18, wherein at least one of $R^5$ and $R^3$ of the fluoroalkyl silicone is H, cured with a vinyl silicone.

21. The release liner of claim 18 wherein at least one of $R^5$ and $R^3$ of the fluoroalkyl silicone is H, and at least one of $R^5$ and $R^3$ of the fluoroalkyl silicone is $-OR^4$ and is cured by hydrosilylation with a vinyl silicone, and moisture or photo-acid cured from Si—$OR^4$.

22. The release liner of claim 19, wherein the fluoroalkyl silicone is photo irradiation cured in the presence of a photoacid generator.

23. An adhesive article comprising (I) a release liner comprising a backing and a cured release coating comprising the fluoroalkyl silicone of claim 1 on at least one surface of the backing, and (II) a pressure-sensitive adhesive in contact with a surface of the release liner.

* * * * *

UNITED STATES PATENT AND TRADEMARK OFFICE
CERTIFICATE OF CORRECTION

PATENT NO. : 9,994,740 B2
APPLICATION NO. : 14/785355
DATED : June 12, 2018
INVENTOR(S) : Zai-Ming Qiu It is certified that error appears in the above-identified patent and that said Letters Patent is hereby corrected as shown below:

Column 1,
Line 57, delete "polyactylates" and insert -- polyacrylates --, therefor.

Column 3,
Line 6, delete "aryl" and insert -- aryl, --, therefor.

Column 4,
Line 60, delete "(Benning" and insert -- (Henning --, therefor.

Column 5,t555555555
Line 28, delete "di," and insert -- di-, --, therefor.
Line 40, delete "potassium," and insert -- potassium --, therefor.
Lines 53 & 54, delete "fluoridation" and insert -- fluorination --, therefor.

Column 6,
Lines 8 & 9, delete "genetically" and insert -- generically --, therefor.

Column 7,
Line 1, delete "3,178,464;" and insert -- 3,178,464, --, therefor.
Line 7, delete "nitrite-" and insert -- nitrile- --, therefor.
Line 26, delete "useful," and insert -- useful --, therefor.
Line 33, delete ")diarylplatinuum" and insert -- )diarylplatinum --, therefor.
Line 37, delete "In" and insert -- in --, therefor.

Column 9,
Line 3, delete "H$_2$C=CHSiMe$_2$(SiMe$_2$O)$_n$(SiPh$_2$O)" and insert
-- H$_2$C=CHSiMe$_2$O(SiMe$_2$O)$_n$(SiPh$_2$O) --, therefor.

Signed and Sealed this
Fourteenth Day of August, 2018

Andrei Iancu
*Director of the United States Patent and Trademark Office*

CERTIFICATE OF CORRECTION (continued)
U.S. Pat. No. 9,994,740 B2

Column 10,
Line 1, delete "one ," and insert -- one, --, therefor.
Line 8, delete "R⁴is" and insert -- $R^4$ is --, therefor.
Line 24, delete "el" and insert -- et --, therefor.
Line 52, delete "arthydride, triethyl ammonium" and insert -- anhydride, triethylammonium --, therefor.

Column 12,
Line 23, delete "aerylates" and insert -- acrylates --, therefor.
Line 37, delete "(Qui et al)." and insert -- (Qui et al.). --, therefor.

Column 13,
Line 10, delete "(Qui et. al.)," and insert -- (Qui et al.), --, therefor.
Line 61, delete "other-synthetic" and insert -- other synthetic --, therefor.

Column 14,
Line 31, delete "Don" and insert -- Dow --, therefor.
Line 59, delete "cheap," and insert -- cheap --, therefor.

Column 16,
Line 13, delete "product" and insert -- product, --, therefor.
Line 50, delete "nonafluorobutly" and insert -- nonafluorobutyl --, therefor.

Column 17,
Line 11, delete "N₁," and insert -- $N_2$, --, therefor.

Column 18,
Lines 43-47, delete " 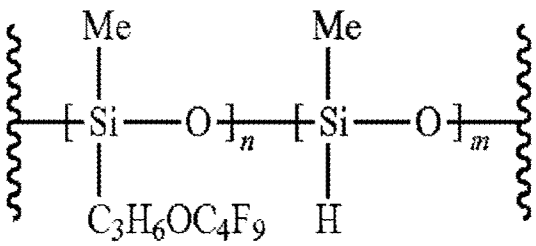 " and insert -- 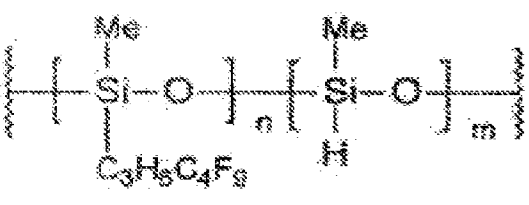 --, therefor.

Column 21,
Line 46, delete "—CF₂C₄F, ₂C₅F₁₁," and insert -- —$CF_2C_4F_9$, —$CF_2C_5F_{11}$, --, therefor.
Line 67, delete "-C₄₈alkyl." and insert -- -$C_{48}$ alkyl. --, therefor.

Column 23,
Line 38, Delete "at least," and insert -- at least --, therefor.

Column 24,
Line 3, delete "$C_1$-$C^4$" and insert -- $C_1$-$C_4$ --, therefor.

Column 25,
Line 27, in Claim 11, delete "$R_f^1$is" and insert -- $R_f^1$ is --, therefor.

Column 26,
Line 1, in Claim 14, after "method" insert -- of --, therefor.
Line 49, in Claim 19, delete "$C_1$-$C^4$" and insert -- $C_1$-$C_4$ --, therefor.